UNITED STATES PATENT OFFICE.

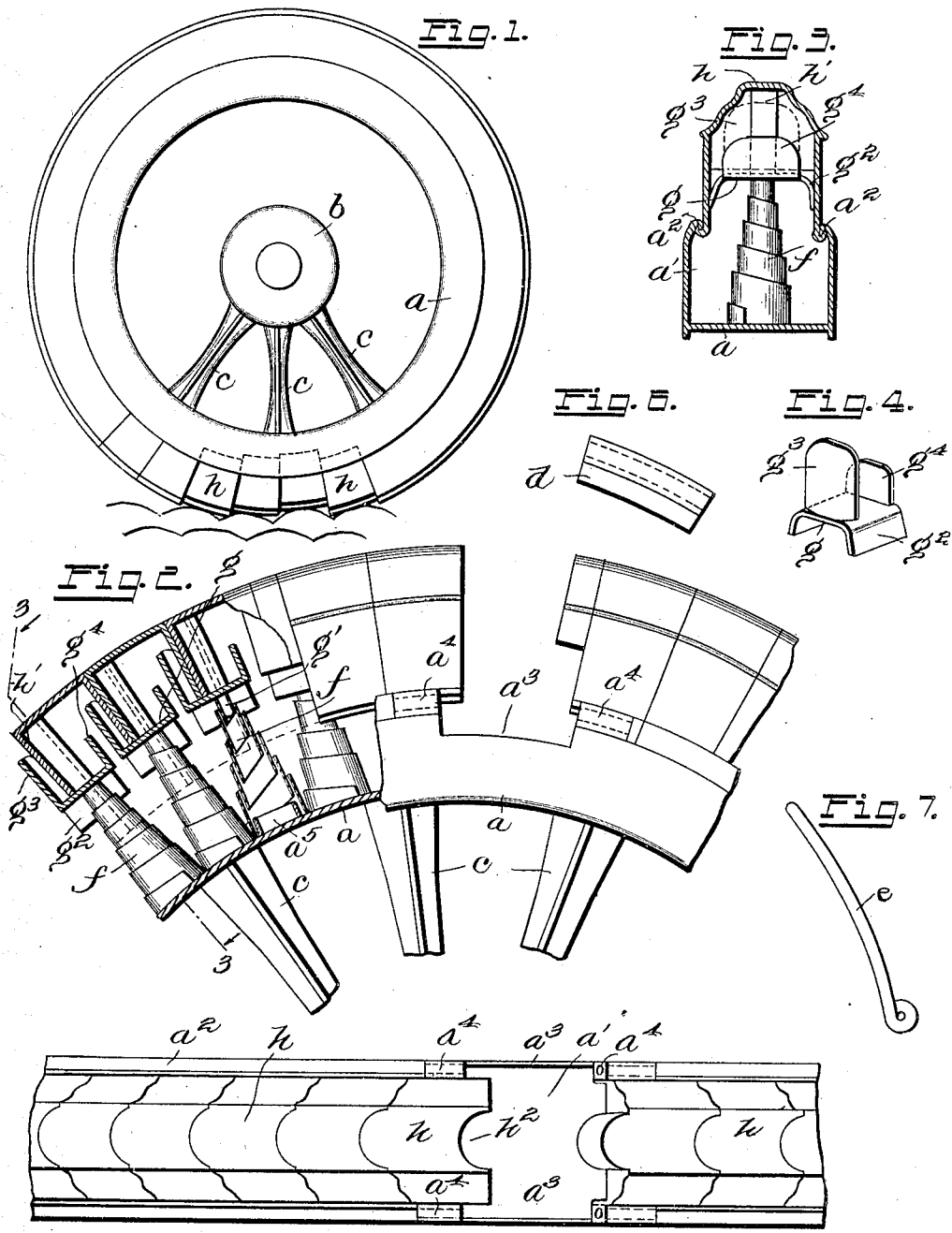

HENRY HUMPHREY MOORE, OF PARIS, FRANCE.

VEHICLE-WHEEL TIRE.

No. 887,684.  Specification of Letters Patent.  Patented May 12, 1908.

Application filed September 22, 1906. Serial No. 335,732.

*To all whom it may concern:*

Be it known that I, HENRY HUMPHREY MOORE, a citizen of the United States, residing at 4 Rue Balzac, Paris, in the Republic of France, have invented new and useful Improvements in Vehicle-Wheel Tires, of which the following is a specification.

The present invention relates to an elastic tire intended for wheels of road vehicles in general, particularly however for wheels of motor cars.

The invention may also be applied to rolling-stock intended to run on railways. This kind of tire, which is perfectly elastic, secures as easy running as a pneumatic tire and by its use the irregularities and obstacles on the road may be passed over without jerks, these irregularities being as it were absorbed and the travelers, as well as the parts of the vehicle provided with said tires, are preserved from the disagreeable and prejudicial jolting to which they are subjected even with the best pneumatic tires. As it is entirely made of metal, this new tire offers moreover the enormous advantage of being completely exempt from the perforations and bursting which are so often the cause of disagreeable halts and sometimes of more or less serious accidents. Finally the said tire is indifferent to the variations of climate; its construction in sections secures an excellent and sure hold on the soil and allows of steep hills being easily ascended and rapid descents being run down without danger even at high speeds. The accidental breaking even at high speed of one or several of the springs used in the construction of the tire would not cause any accident and would not prevent the car from continuing its course until the damage could be repaired conveniently.

In the accompanying drawing Figure 1 is an elevation of a wheel provided with a tire constructed according to the invention showing the manner in which the various sections of the metallic tire come to bear on uneven ground, a paved road for instance. Fig. 2 is an elevation, partly in section and on a larger scale, of a wheel fragment provided with this tire. Fig. 3 is a section along 3—3 of Fig. 2. Fig. 4 is a perspective view of one of the bolsters. Fig. 5 is a plan of Fig. 2, and Figs. 6 and 7 are details of detached parts.

In the usual arrangement which is particularly intended for motor cars (Figs. 1 to 7) the tire is composed of metallic sections which fit into each other and are arranged on the circumference of the felly in such a manner that they are prevented from falling out. They are subjected to the action of internal springs which operate on two sections conjointly and tend to force back the sections elastically towards the exterior to the periphery of the felly.

$a$ is the felly of the wheel; it consists of a metallic hoop having a U shaped section provided on the edges of the circular groove or channel $a'$ which it forms with heel-pieces or turned in flanges $a^2$. This felly is connected with the hub $b$ by spokes $c$, which are preferably also metallic and may, as well as the hub, be of any kind of construction which secures a maximum resistance and is as light as possible. At a point on its periphery the felly $a$ shows on each of its flanges an interruption or intersection $a^3$ which is intended to allow of the various sections or constituent elements of the elastic tire being inserted in the felly. When the last section is put in its place, the felly is closed by a closing piece $d$ (Fig. 6) which is fastened in its position by a key or pin $e$ (Fig. 7) which is inserted into said closing piece as well as into the holes $a^4$, which are provided for this purpose at the ends of the intersection $a^3$ on the flange of the wheel; said closing piece may also be fastened by any other suitable means.

At the bottom of the groove or channel $a'$ of the felly $a$ seats $a^5$ are formed at regular intervals. They equal in number the movable sections or elements of the elastic tire. On each of these seats the extreme inner end of a spring $f$ is placed (preferably a spring with a spiral blade which is conical or cylindrical) on the outer end of which a bolster $g$ is arranged having a pin $g'$ projecting beneath it. This pin $g'$ is inserted in the extreme end of the spring $f$ and centers the same, while at the same time it keeps the spring in position. The bolster $g$ is provided in planes which are parallel to the plane of the wheel with inclined wings $g^2$ (Figs. 3 and 4) which serve to guide the bolster and render it stable in a lateral sense. On the bolsters $g$, the sections or metallic elements $h$ are placed which constitute the tread or tire proper of the wheel.

Each of these elements $h$ of the tire consists essentially of a sort of box which is provided outside on one of its sides with the flat faces $h^0$, (Fig. 5,) terminating centrally in a hollow projection forming a hollow tongue $h'$, (Figs. 2 and 5) which is preferably semicylindrical in shape, and on its opposite side the elements $h$ are provided with the flat faces $h^\times$, (Fig. 5), and a depressed central portion forming a groove $h^2$ corresponding in shape to and adapted to receive the projection $h'$ of the adjacent element to allow of longitudinal play. In other words, the various elements fit into one another in a tongue and groove fashion all round the periphery of the felly of the wheel $a$ so as to slidably support each other when they are all in position. Each of the bolsters $g$ is placed conjointly beneath two adjacent elements $h$ and is provided with projecting lugs $g^3$, $g^4$ (Figs. 2 and 4) one of which enters the inside of each of the said hollow elements $h$ and is placed inside the wall or side corresponding to each of these elements and may be made to closely resemble the form of the latter. This arrangement is best shown in Fig. 2. Each element $h$ is moreover provided with flanges or depending sides $h^3$ which prolong its sides which are parallel with the wheel; at their free ends the edges of these flanges are bent over so as to form grooves which hook onto the heel-pieces or turned-in flanges $a^2$ of the felly, so that the elements are kept in place on this felly.

When mounting the tire on the wheel the elements $h$ of the felly $a$ are successively inserted by passing them through the intersection $a$ and making them slide round the felly in order to bring them into position above the bolster $g$ and the corresponding spring $f$; the latter parts may be inserted directly into the groove of the felly. When the last element is inserted in the felly, the closing pieces $d$ are placed in position and fastened with keys $e$ or otherwise. The unmounting of the parts is done in the reverse order.

When the wheel is in use and passes over an obstacle the sections $h$ of the tire give way individually to the passage of the obstacle as shown in Fig. 1 by compressing the springs $f$ which absorb the shock; this shock is consequently not transmitted to the frame of the vehicle nor to the persons occupying the latter and the tire is found to be more effective in this respect than the best pneumatic tire and it secures just as easy, if not even a better, running of the vehicle. Finally the dust, mud, and dirt will be cast away by the centrifugal force and there will be no risk of their remaining in the interstices which separate the elements and of their filling the same.

It is evident that the invention is not strictly limited to the precise arrangements nor to the details of construction described above and shown in the accompanying drawing, as certain modifications may be made to the same without departing from the principle, according to practical requirements. Moreover all kinds of suitable material may be used for the manufacture of the constituent elements of the wheel and the tire, such as steel, iron, aluminum, etc.

What I claim is:—

1. An elastic tire for vehicle wheels comprising, in combination with a felly: metallic sections inserted one in the other all around the felly; means for preventing the sections from falling out of said felly and springs, each working conjointly on two sections at a time and tending to elastically force the sections outwardly to the periphery of the felly, substantially as and for the purposes described.

2. In a spring wheel, a bolster for the purpose set forth provided with a pair of upwardly-projecting lugs, a pair of downwardly projecting wings, and a downwardly-projecting centering pin, substantially as described.

3. In a wheel, the combination of a channeled felly, a plurality of tread members contained therein and radially displaceable relatively thereof, means for preventing complete displacement of said tread members, bolsters supporting the adjacent inner sides of said tread members, a spring interposed between said bolsters and said felly, and means for inserting said tread members in said felly comprising a cut-away portion formed in said channeled felly, an insert piece for said cut-away portion, and means for securing said insert piece in position, substantially as described.

4. In an elastic tire, in combination: a felly provided with a circumferential groove having on its sides inturned flanges; seats spaced regularly at the bottom of said groove; springs of which one rests by its inner end upon each of said seats; a bolster resting upon the outer end of each of said springs; a point depending from below each bolster and entering the end of the corresponding spring; wings extending downwards upon each bolster to guide it and give it stability laterally and metallic tire sections or elements resting upon the said bolsters all around the felly and each of which has on one of its sides a tenon or projection and, on the opposite side, an opening of corresponding shape intended to receive the tenon or projection of the adjacent element, substantially as and for the purposes described.

5. In an elastic tire, in combination: a felly having a circumferential groove; seats at the bottom of said groove; springs made of spiral strips resting by their inner ends upon said seats; bolsters upon the outer ends of said springs; metallic tire sections or elements independently movable radially and resting upon said bolsters all around the tire, each bolster being arranged astride under two adjacent sections or elements; means upon these sections or elements securing their insertion in one another; means on the sides of the groove in the felly to prevent the said sections or elements from falling out of the said felly; a cut or incision at a point in the periphery of the felly to allow the introduction therein of the various sections or elements constituting the elastic tire; a filling for closing the said cut or incision after the last element has been inserted and a key inserted into the said filling and into the openings made for the purpose at the ends of the said cut or incision to fasten the filling into position, substantially as and for the purposes described.

6. In an elastic tire, in combination: a felly provided with a peripheral groove; seats at the bottom of said groove all around the felly; spiral springs resting by their inner ends upon said seats; juxtaposed plates or slabs provided with flanges which bear directly upon the outer ends of said springs; inturned flanges on the edges of the felly groove, with which the flanges of the slabs engage and against which they are normally pressed by said springs; a cut or incision in one of the sides of the felly for the introduction of said slabs in the groove thereof; a filling to close said cut or incision after the insertion of all the slabs into position and means for fixing said filling in position, substantially as and for the purposes described.

In testimony whereof I have signed my name to this specification in the presence of two subscribing witnesses.

HENRY HUMPHREY MOORE.

Witnesses:
DOUGLAS HORACE BRANDON,
HANSON C. COXE.